G. SETTER.
PISTON RING.
APPLICATION FILED NOV. 30, 1918.

1,363,281.

Patented Dec. 28, 1920.

Witnesses
Robert F. Weir
Arthur W. Carlson

Inventor
George Setter
By Arthur L. Durand
Atty.

UNITED STATES PATENT OFFICE.

GEORGE SETTER, OF CHICAGO, ILLINOIS, ASSIGNOR TO PEERLESS PISTON RING M'F'G. CO., OF CHICAGO, ILLINOIS, A CORPORATION OF ILLINOIS.

PISTON-RING.

1,363,281.  Specification of Letters Patent.  Patented Dec. 28, 1920.

Application filed November 30, 1918. Serial No. 264,765.

*To all whom it may concern:*

Be it known that I, GEORGE SETTER, a citizen of the United States of America, and a resident of Chicago, Illinois, have invented a certain new and useful Improvement in Piston-Rings, of which the following is a specification.

This invention relates to piston rings of that kind in which the end portions of the ring overlap to form a tight joint.

Generally stated, the object of the invention is to provide a novel and improved construction and formation of said joint, in a ring for this purpose, whereby both leakage and breakage will be less liable to occur.

It is also an object to provide certain details and features of construction tending to increase the general efficiency and the serviceability of a piston ring of this particular character.

To the foregoing and other useful ends the invention consists in matters hereinafter set forth and claimed, and shown in the accompanying drawings, in which—

Figure 1:
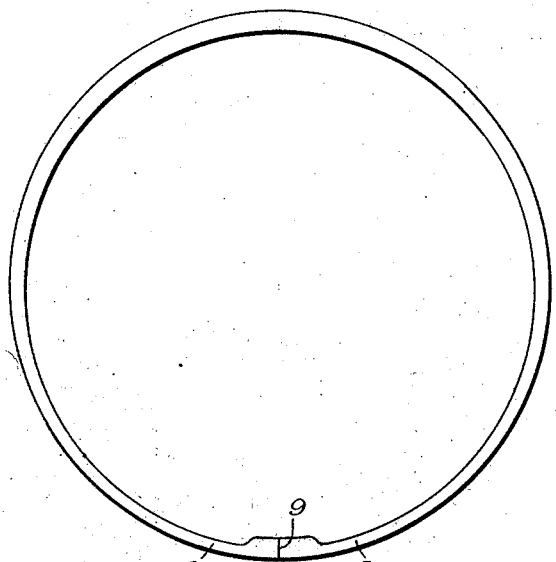
Figure 1 is a plan of a piston ring embodying the principles of the invention.
Figure 2:
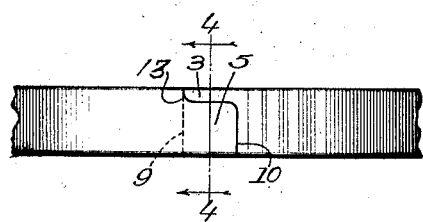
Fig. 2 is an enlarged side elevation of the lap joint of said ring.
Figure 3:
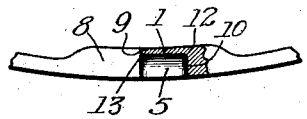
Fig. 3 is a plan of the portions shown in Fig. 2, showing said parts in horizontal section.
Figure 4:
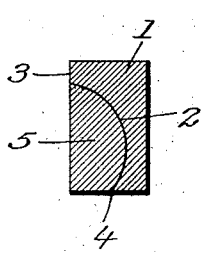
Fig. 4 is an enlarged cross section on line 4—4 in Fig. 2.
Figure 5:
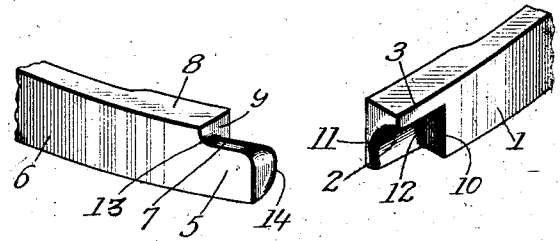
Fig 5 is an enlarged perspective of the two end portions of the ring.

As thus illustrated, one end portion 1 of the ring is formed with a groove 2 that provides a cavity in the periphery of the ring, this groove being so formed and located that a narrow portion 3 of the periphery of the ring extends along one side of the groove, whereby the latter is deeper at one side than at the other. Said groove, it will be seen, is in cross section curved about an axis located between the planes of the two flat opposite sides of the ring, so that the groove is deeper between the flat sides of the ring. As shown in Fig. 4, it will be seen that the narrow portion 3 forms one side edge of the groove, and that the other side edge 4 is nearer the axis of the ring, so that the groove is low at one side and high at the other; but the bottom of the groove is nearer said axis than are the other portions of the groove, whereby the latter provides a trough to receive the tongue 5 on the other end portion 6 of the ring. This tongue is rounded in cross section, (see Fig. 4), so that it slides into the groove 2 and fits therein, and the groove holds the tongue against lateral displacement in either direction, when the ring is in use on the piston of the engine, because the bottom or deepest part of the groove is nearest the inner side of the ring, as shown in Fig. 4. It will be understood, of course. that the ring is springy and must be compressed somewhat in order to bring the tongue 5 within the cavity formed by the groove 2, the ring when contracted having a lap joint, as shown in Fig. 1, and as illustrated in Figs. 2, 3 and 4, thereby to prevent leakage. The tongue 5 is narrower than the ring, so that a space 7 is provided to receive the narrow portion 3, the combined width of the tongue 5 and this narrow portion 3 being equal to the width of the ring. It will also be seen that the end portion 1, which is grooved as shown and described. is as wide as the ring at the inner side thereof. whereby one side of the tongue 5 is flush with one side of the ring; but the other side of the tongue is stepped inwardly, thereby to form the space 7 for the narrow portion 3, so that the latter is then flush with the other side of the ring. The portion 6 is thicker at 8, so that a shoulder is formed at 9 to engage the end of the portion 1, (see Fig. 3), the end of the tongue 5 abutting against the shoulder 10 on the end portion 1 when the ring is fully contracted. The groove 2, it will be seen, has its outer or end corner rounded at 11, and the inner corner 12 is also rounded, whereby a fracture is not liable to start at the corner 12, but which might occur if this corner were left a sharp angle, as is sometimes done in the manufacture of articles of this kind. It will also be seen that the corner 13 between the shoulder 9 and the rounded surface of the tongue 5 is rounded, instead of being left a sharp angle, whereby this corner fits the rounded corner 11 on the other end portion; and, in this way, a fracture is not liable to start where the tongue 5 joins the shoulder 9, such as might occur if this angle were left sharp. The outer corner 14 of the tongue is rounded to fit the rounded corner 12 previously described.

In this way, a lap joint is provided which serves effectively to prevent leakage, and at the same time it is strong in character and adapted to resist strain in every direction, and the formation tends to prevent breakage.

What I claim as my invention is:—

1. A piston ring having a lap-joint formed by the end portions of the ring, one end portion being provided with a rounded groove forming a cavity on the periphery of the ring, the groove being curved in cross section about an axis located between the planes of the two flat opposite sides of the ring, and the other end portion being formed with a tongue which is curved on the inner side thereof about said axis to slide lengthwise in said groove to occupy said cavity, said groove and tongue being relatively formed to hold the tongue against lateral displacement in either direction.

2. A piston ring as specified in claim 1, said cavity being deeper at one side than at the other, so that a narrow portion of the periphery of the ring extends along one side of the cavity, said tongue being formed to provide space at one side thereof for said narrow portion, whereby the combined width of said tongue and narrow portion is equal to the width of the cylindric outer surface of the ring, and the grooved end portion having this same width, said groove being formed with its bottom nearest the inner side of the ring and being deeper between the side edges thereof and thereby holding the tongue against lateral displacement in either direction.

3. A piston ring as covered by claim 2, said groove having rounded corners (11 and 12) at the opposite ends thereof, and said tongue being rounded at its opposite ends (13 and 14) to fit said corners, whereby sharp corners are avoided at these points to reduce the danger of fracture.

GEORGE SETTER.